United States Patent [19]
Stone et al.

[11] Patent Number: 5,234,148
[45] Date of Patent: Aug. 10, 1993

[54] METHOD OF WELDING AND A SYSTEM THEREFOR

[75] Inventors: Philip L. Stone, Blackpool; David H. Hoskyn, Runcorn; Bruce R. Keesing, Cheadle Hulme, all of United Kingdom

[73] Assignee: British Nuclear Fuels plc, Chesire, United Kingdom

[21] Appl. No.: 920,868

[22] Filed: Jul. 28, 1992

[30] Foreign Application Priority Data

Aug. 10, 1991 [GB] United Kingdom ............ 91173286

[51] Int. Cl.⁵ .................................................. B23K 35/38
[52] U.S. Cl. ............................................ 228/8; 228/42; 137/13; 137/88; 219/74
[58] Field of Search ............... 228/219, 102, 8, 42; 219/74; 137/3, 13, 88, 807

[56] References Cited

U.S. PATENT DOCUMENTS

| | | | |
|---|---|---|---|
| 3,636,754 | 1/1972 | Lynworth et al. | 73/597 |
| 4,080,964 | 3/1978 | Savoie, Jr. | 128/210.27 |
| 4,150,561 | 4/1979 | Zupanick | 137/807 |
| 4,655,075 | 4/1987 | Albert et al. | 73/32 A |
| 4,664,124 | 5/1987 | Ingle et al. | 128/660.02 |

FOREIGN PATENT DOCUMENTS

| | | |
|---|---|---|
| 840918 | 7/1960 | United Kingdom. |
| 1176300 | 12/1968 | United Kingdom. |
| 2049638A | 12/1980 | United Kingdom. |

OTHER PUBLICATIONS

British Search Report.

Primary Examiner—Samuel M. Heinrich
Attorney, Agent, or Firm—Nixon & Vanderhye

[57] ABSTRACT

A method of welding in which an inert gaseous shield at a welding zone is provided by a mixture of gases of different densities. The proportions of the individual gases in the mixture are controlled to ensure that the density of the gas mixture is about the same as the density of the surrounding atmospheric air. Cryogenic means may be used to form a condensed gas plug in a pipe or the like to be welded.

14 Claims, 4 Drawing Sheets

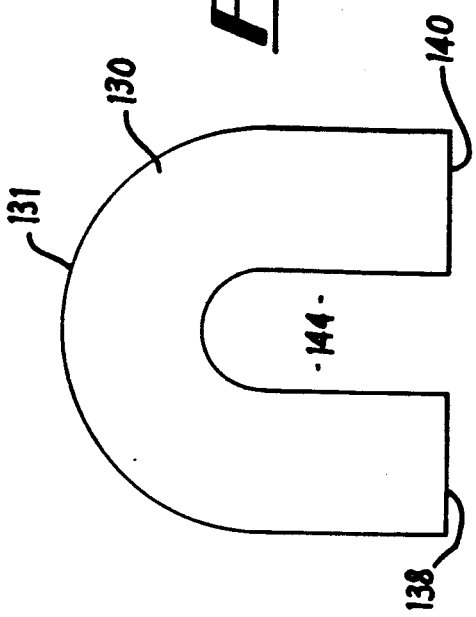
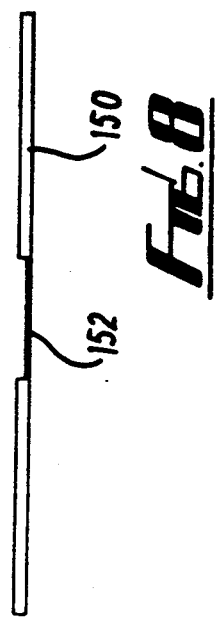
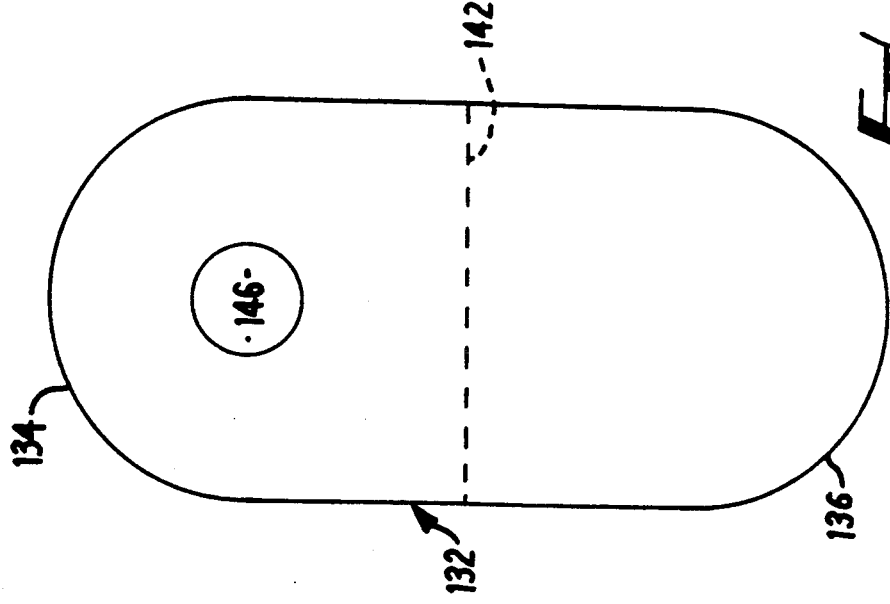

METHOD OF WELDING AND A SYSTEM THEREFOR

This invention relates to a method of welding and to a system therefor, and more particularly to a method and to a system in which an inert gas is used as a purge gas at a welding zone.

According to one aspect of the present invention, there is provided a method of welding under an inert gaseous shield at a zone, wherein the shield comprises a mixture of inert gases of different densities, the proportions of gases in the mixture being controlled so that the density of the mixture is substantially the same as the density of atmospheric air at the zone.

The invention accordingly provides, in a second aspect, a system for producing a gas mixture for use in welding and having a density substantially equal to the density of the atmospheric air at a zone, the system comprising:
 means for mixing at least two inert gases from a supply of the gases, one said gas being lighter than air and the other said gas being heavier than air;
 means for comparing the density of the mixed gases with the density of the atmospheric air about the system, and
 means for varying the proportions of the gases in the gas mixture in response to any imbalance in the densities detected by the comparing means so as to equalise the density of the gas mixture with the density of the said atmospheric air.

Cryogenic means may be provided for forming a condensed gas plug in a pipe to be welded according to the invention.

Preferably, the mixing means comprises a plurality of permeable discs disposed substantially diametrally within a tube to define a series of chambers between the discs, an inlet for both the gases into the first said chamber, and an outlet for mixed said gases from the last said chamber, whereby the gases diffuse progressively from said chamber to said chamber and are mixed thereby.

Preferably, the comparing means comprises a first tube having an inlet to admit mixed gas from the mixing means, a second tube having at least one inlet to admit said atmospheric air, means for measuring the density of the gas mixture in the first tube, means for measuring the density of the said atmospheric air in the second tube, and means for providing a signal related to any imbalance in the density of the gas mixture and the atmospheric air.

Conveniently, the varying means varies the proportion of the lighter gas in the gas mixture so as to maintain the density of the gas mixture at substantially the same density as that of said atmospheric air.

It will be understood that as used herein the term "inert gas" means a gas which is inert to the conditions at the zone.

The invention will now be further described, by way of example only, with reference to the accompanying drawings, in which:

FIGS. 6 to 8 show plan views of part of the system of FIG. 5 to an enlarged scale.

Figure 1:
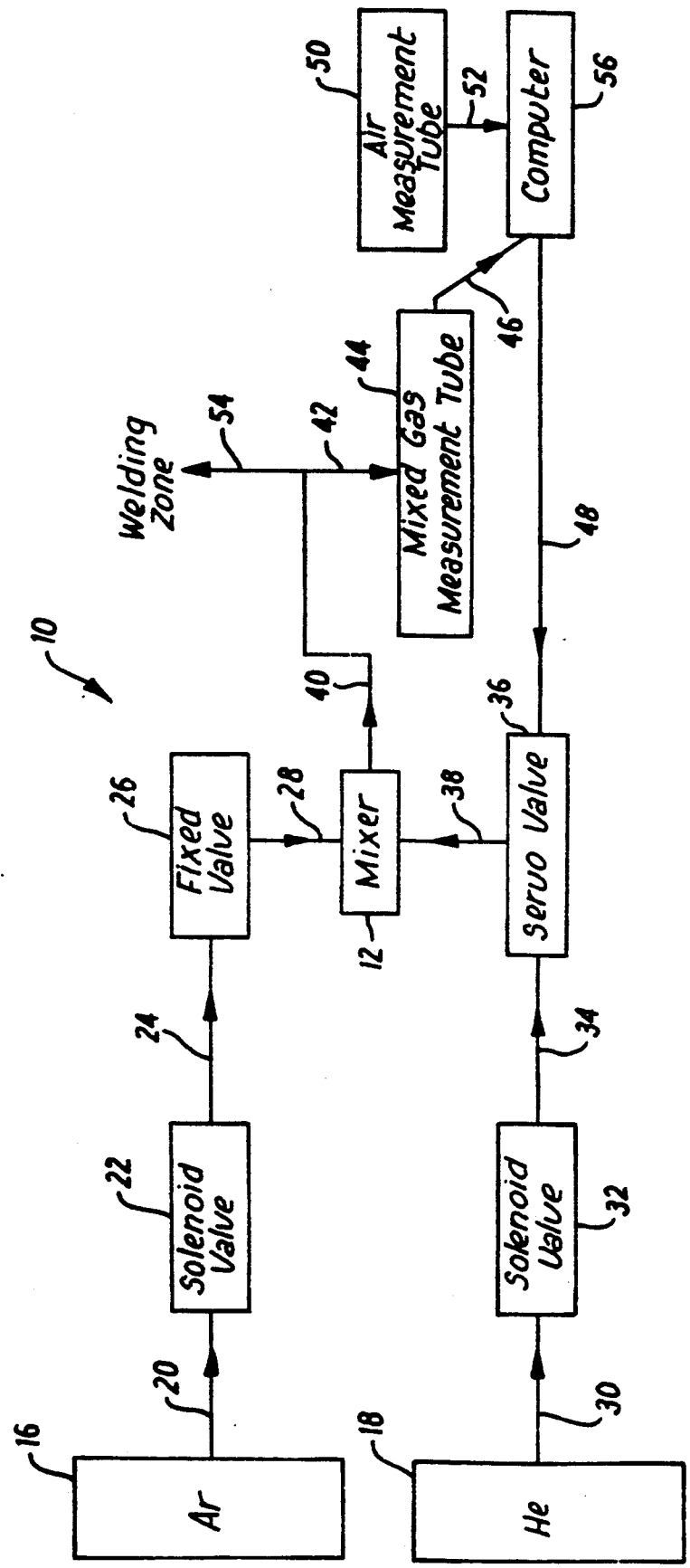
FIG. 1 shows a schematic representation of a system for supplying an inert purge gas for welding.

Referring now to FIG. 1, a system 10 is shown for providing a helium/argon gas mixture for use as a purge gas in a welding operation. In the system 10, a mixer 12 is supplied with argon from a source 16 and with helium from a source 18. The source 16 is connected by a line 20 to a solenoid valve 22 having a line 24 to a fixed valve 26, and from which a line 28 connects the fixed valve 26 to the mixer 12. The source 18 is connected by a line 30 to a solenoid valve 32 having a line 34 to a servo valve 36, and a line 38 connects the servo valve 36 to the mixer 12.

A line 40 connects the mixer 12 to a line 42 of relatively narrow bore and to an outlet 54 to a welding zone (not shown). The line 42 connects to a mixed gas measurement tube 44, and a line 46 carries signals from the mixed gas measurement tube 44 to a computer 56 which has an output line 48 to the servo valve 36. An air measurement tube 50 also provides an output to the computer 56 through a line 52.

Figure 2:
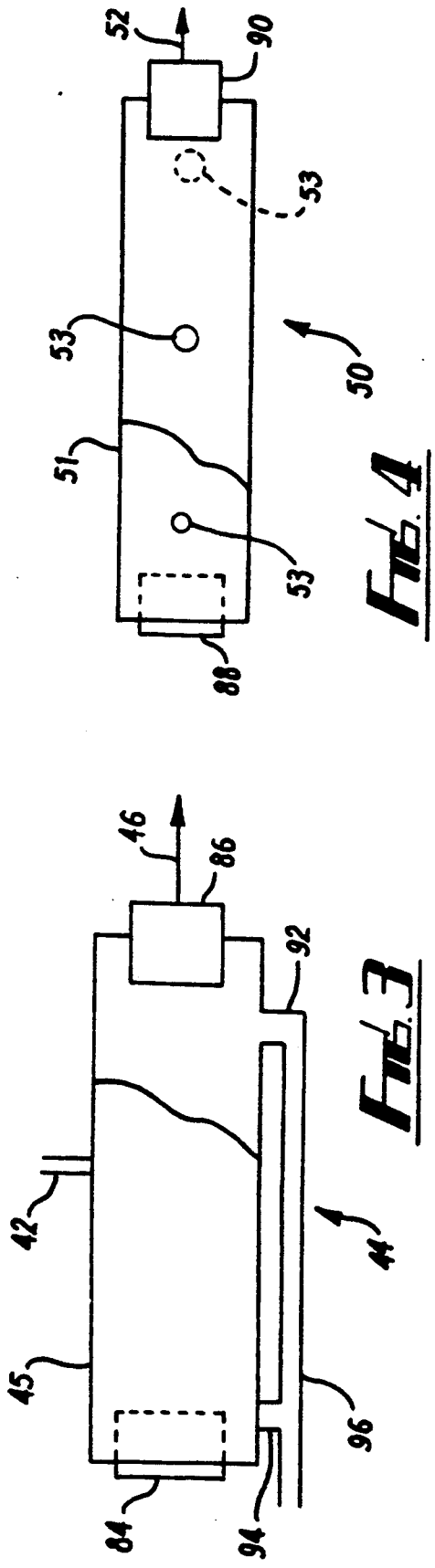
FIG. 2 shows to an enlarged scale, and in part-median section, part of the system of FIG. 1.

As shown in FIG. 2, the mixer 12 comprises a cylindrical vessel 70 sub-divided into a number of chambers 71 (only four are shown) by cylindrical spacers 72 and diametrally disposed permeable plastic discs 74. Argon and helium are arranged to enter the mixer 12 together under pressure through the lines 28, 38 respectively, so that they are forced through the microscopic pores of the discs 74. The mixed gas exits from the mixer 12 through the line 40.

Figure 3:
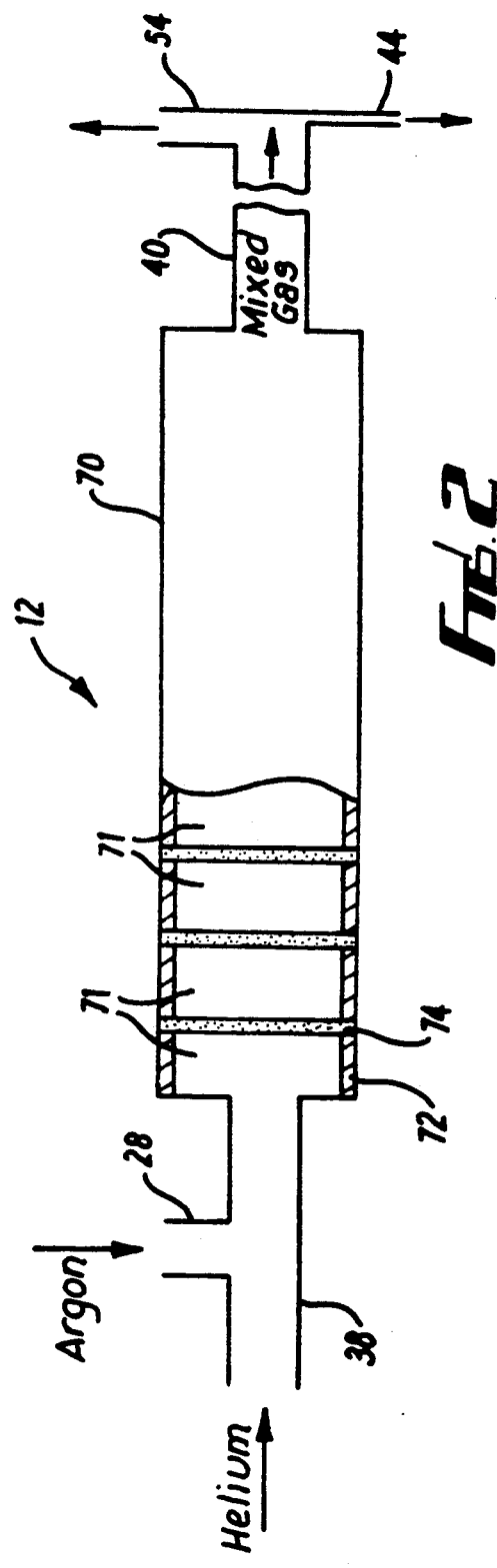
FIG. 3 shows to an enlarged scale, and in 5 part-median section another part of the system of FIG. 1.
Figure 4:
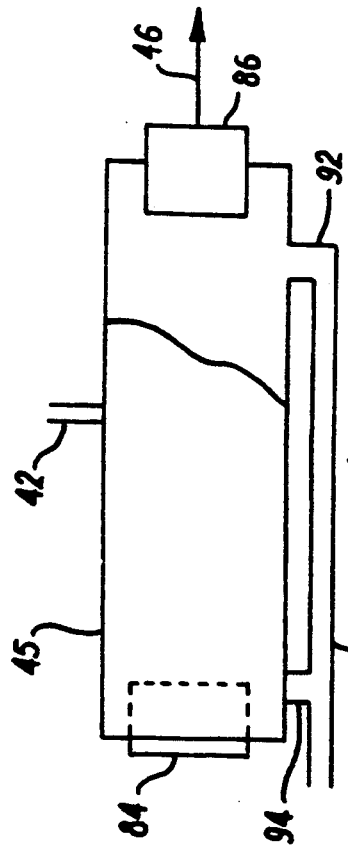
FIG. 4 shows to an enlarged scale, and in part median section, a further part of the system of FIG. 1.

Referring again to FIG. 3, the mixed gas measurement tube 44 comprises a cylinder 45 having closed ends and the inlet 42 at its mid-point where it is supplied with a sample of the mixed gas from the mixer 12. Two outlets 92, 94 connect to an outlet line 96 through which the gas sample is exhausted to atmosphere. The air measurement tube 50 as shown in FIG. 4 comprises a cylinder 51 having closed ends and three holes 53 evenly spaced along its length to allow the ingress of atmospheric air. One of the holes 53 is displaced by 180° from the other holes 53.

Each of the tubes 44, 50 has an ultrasonic transmitter 84, 88 respectively located at one end thereof, and receivers 86, 90 respectively located at the other ends thereof from which signals are carried to the computer 56 of FIG. 1 by the lines 46 and 52 respectively.

In operation of the system 10, argon gas is supplied to the mixer 12 from the gas cylinder 16 by successively flowing through the line 20, the solenoid valve 22, the line 24, the fixed valve 26 and finally into the mixer 12 through line 28. Helium gas is supplied to the mixer 12 from the gas cylinder 18 by successively passing through the line 30, the solenoid valve 32, the line 34, the servo valve 36 and into the mixer 12 through the line 38. The gases are mixed in the mixer 12 as described above with reference to FIG. 2. The gas mixture from the mixer 12 is supplied to the welding zone through the outlet 54 and to the gas measurement tube 44 through the line 42, the narrow bore of the line 42 restricting the flow of mixed gases to the gas measurement tube 44.

Ultrasonic signals are simultaneously transmitted by the ultrasonic transmitters 84, 88 through the tubes 44, 50 respectively and the signals are received by the ultrasonic receivers 86, 90 respectively. Data from the receivers 86, 90 is fed to the computer 56 through the lines 46, 52 respectively. The data is processed by the computer 56 to calculate the velocity of sound in the gas mixture and in the atmospheric air. The velocity of sound measured obeys the equation:

$$c = \sqrt{\frac{\gamma p}{\rho}}$$

where c is the velocity of sound in the gas being studied;

$\gamma$ is the ratio of specific heat at constant pressure to that at constant volume for the gas being studied;

p is the ambient gas pressure; and $\rho$ is the density of the gas being studied Since the velocity of sound through a gas varies with the density of that gas, this provides a means of comparing the density of the gas mixture with that of the atmospheric air. By measuring the time difference between the reception of the ultrasonic signals by the ultrasonic receivers 86, 90, the computer 56 can calculate by how much the ratio of helium to argon in the gas mixture should be adjusted in order to achieve a density equal to that of the atmospheric air. The computer 56 sends a control signal through the output line 48 in order to open or close the servo valve 36, thereby adjusting the proportion of helium in the gas mixture.

If the tubes 44, 50 are of equal length, the problem arises that the difference in the ultrasonic signal transit times will vary with atmospheric conditions. This is caused by the fact that $\gamma$ in the above equation is not the same for air as it is for the gas mixture. However by arranging the tubes 44, 50 to be of unequal lengths such that the ratio of their lengths is equal to the ratio of the square root of $\gamma$ for air to the square root of $\gamma$ for the gas mixture, the difference in the ultrasonic signal transit times will be zero regardless of atmospheric variations. Any difference in the ultrasonic signal transit times will be solely due to differences in the densities of the atmospheric air and the gas mixture.

The gas mixture from the mixer 12 leaves the system 10 through the outlet 54 and is then transferred to a welding zone (not shown) where it may be injected, for example, into an open butt joint, as a result of which the air in the welding zone is forced away from the point of injection. When a sufficient quantity of the gas mixture has been injected into the welding zone, a welding process may be performed. Since the density of the gas mixture is substantially the same as that of the ambient atmospheric air, the gas mixture will remain at the welding zone so that contamination of the weld by the atmospheric air is minimised.

One of the advantages of the invention is that the process enables purging of a welding zone by means of an open butt joint where conventional flow purging or vacuum purging is not possible.

Another advantage is that the invention does not require the welding zone to be sealed, for example, the welding zone may be in open-ended tubes.

For some applications, however, it may be necessary to inhibit the gas mixture from moving away from the welding zone, for example when access is only possible through the welding zone as in an open butt joint to be welded in a pipeline. For such applications cryogenic plugs may be used upstream of the open butt joint as described in relation to FIGS. 5 to 8.

Figure 5:
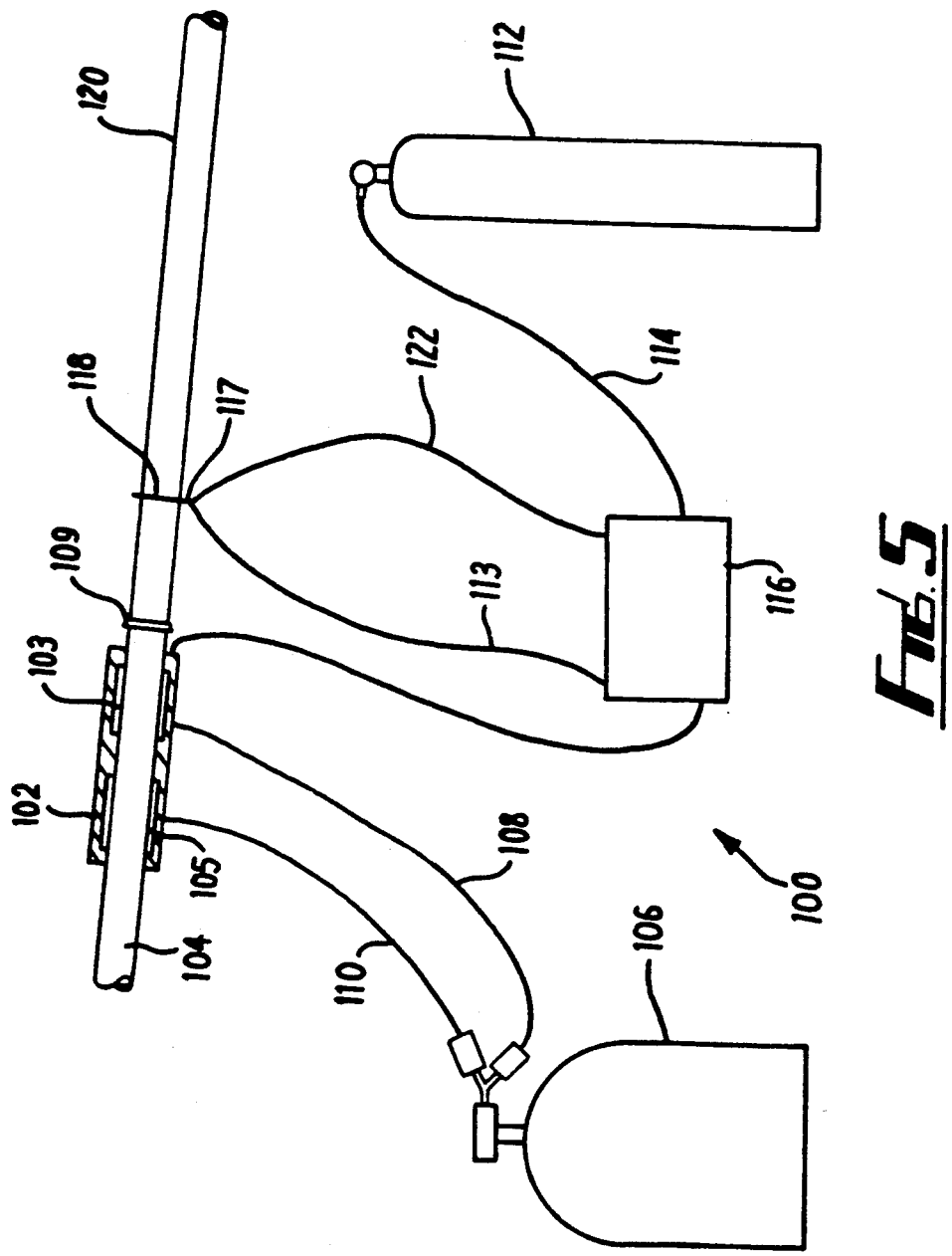
FIG. 5 shows a diagrammatic representation of a cryogenic plug system for a pipe to be welded.

In FIG. 5, a cryogenic plug system 100 is shown and comprises a cryogenic collar 102 about a pipe 104 to be welded. The collar 102 defines two axially displaced chambers 103, 105 respectively about the pipe 104. A liquid nitrogen supply 106 is connected to the chambers 103, 105 by respective lines 108, 110. A carbon dioxide supply 112 is connected by a line 114 through a control system 116, and through a line 113 to an injection wafer 117 at an open butt joint 118 to be welded between the pipe 104 and an adjacent pipe 120 downstream of the pipe 104. A pressure sensing line 122 is connected between the injection wafer 117 and the control system 116. An electric heater band 109 is disposed about the pipe 104 near to the collar 02 but between the collar 102 and the open butt joint 118. A temperature sensing lead 126 is connected between the collar 102 and the control system 116.

As shown in FIGS. 6 to 8, the injection wafer 117 is formed by placing a "horseshoe" shaped inner stainless steel shim 130 having a round end 131 inside an outer stainless steel shim 132 having round ends 134, 135 that conform with the round end 131. Flat ends 138, 140 of the inner shim 130 are aligned just above the mid-point 142 (shown in broken line) of the outer shim 132, so that the space 144 inside the inner shim 130 communicates with a hole 146 through an upper half (as shown) of the outer shim 132. A narrow bore (1.5 mm) stainless steel tube 150 is relieved to expose the bore at a central portion 152. The tube 150 is placed along the mid-point 142 such that its ends protrude beyond the outer shim 132, the outer shim 132 then being folded over at its mid-point 142 and soldered around its outer edges. The injection wafer 117 so formed is inserted through the open butt joint 118 with the hole 146 facing towards the collar 102, one end of the tube 150 being connected to the line 113 and the other end of the tube 150 being connected to the pressure sensing line 122.

In operation, the heater band 109 is engaged to prevent the adjacent portion of the pipe 104 from cooling to below ambient. Carbon dioxide gas is then injected into the pipe 104 from the line 113 to force any moist gas away from the vicinity of the collar 102. Liquid nitrogen is injected into the collar 102 through the lines 108, 110 to condense the carbon dioxide in the pipe 104 and gradually form a carbon dioxide plug that blocks the bore of the pipe 104. As condensation of the carbon dioxide occurs and the plug forms the pressure inside the pipe 104 at the collar 102 falls below atmospheric pressure, this being detected by the control system 116. The injection wafer 117 is then removed and the gas mixture from the system 10 of FIGS. 1 to 4 is injected through the open butt joint 118. After about 10 minutes, additional liquid nitrogen is fed through the line 108 into the chamber 103 so as to reduce the temperature of the pipe 104 at the chamber 103 to about $-190°$ C. This temperature ensures that any water would be frozen which may have condensed on to the inner surface of the pipe 104 at the chamber 103 after removal of the injection wafer 177, and also acts as a cold-trap to inhibit warm mixed gas (heated by the welding) from causing any sublimation of the solid carbon dioxide plug that might lead to carbon dioxide reaching the open butt joint 118. Welding of the open butt joint 118 can now proceed.

We claim:

1. A system for producing a gas mixture for use in welding and having a density substantially equal to the density of the atmospheric air at a zone, the system comprising:

means for mixing at least two inert gases from a supply of the gases, one said gas being lighter than air and the other said gas being heavier than air;

means for comparing the density of the gas mixture with the density of the atmospheric air about the system, and means for varying the proportions of the gases in the gas mixture in response to any imbalance in the densities detected by the comparing means so as to equalise the density of the gas mixture with the density of the said atmospheric air.

2. A system as claimed in claim 1 wherein the mixing means comprises a hollow cylinder, a plurality of permeable discs disposed substantially diametrally within the hollow cylinder to define a series of chambers between the discs, an inlet for both gases into the first said chamber, and an outlet for mixed said gases from the last said chamber, whereby the gases diffuse progressively from said chamber to said chamber and are mixed thereby.

3. A system as claimed in claim 2, wherein the varying means is arranged to vary the proportion of the lighter gas in the gas mixture so as to maintain the density of the gas mixture at substantially the same density as that of said atmospheric air.

4. A system as claimed in claim 1, wherein the comparing means comprises a first tube having an inlet to admit mixed gas from the mixing means, a second tube having at least one inlet to admit said atmospheric air, means for measuring the density of the gas mixture in the first tube, means for measuring the density of the said atmospheric air in the second tube, and computing means for providing a control signal related to any imbalance in the density of the gas mixture and of the atmospheric air.

5. A system as claimed in claim 4, wherein the density measuring means comprises ultrasonic transmitters respectively located at one end of each of the first and the second tubes and receivers respectively located at the other ends thereof, and the receivers are arranged to provide input signals to the computing means.

6. A system as claimed in claim 5, wherein the computing means, in response to said input signals, provides a control signal related to any imbalance in the density of the gas mixture and the atmospheric air.

7. A system as claimed in claim 4, wherein the first and the second tubes are arranged to be of unequal lengths such that the ratio of their lengths is equal to the square root of the ratio of specific heat at constant pressure to specific heat at constant volume for air to the square root of the ratio of specific heat at constant pressure to specific heat at constant volume for the gas mixture.

8. A system as claimed in claim 4, wherein the varying means comprises valve means which open or close so as to adjust the proportion of the lighter gas in the gas mixture.

9. A system as claimed in claim 4, wherein the inert gases comprise helium and argon.

10. A system as claimed in claim 1, including cryogenic means for forming a condensed gas plug in a pipe or the like having a joint to be welded.

11. A system as claimed in claim 10, wherein said cryogenic means define two adjacent axially displaced annular chambers arranged to be disposed co-axially about the pipe, each said chamber being arranged to be supplied with a cryogenic fluid.

12. A system as claimed in claim 11, wherein the cryogenic fluid comprises liquid nitrogen, and the gas comprises carbon dioxide.

13. A system as claimed in claim 10, including means for introducing the gas into the pipe, said means including pressure sensing means for sensing the pressure between the joint and the region for the plug.

14. A system as claimed in claim 10, including means for heating that portion of the pipe near to the joint to at least ambient.

* * * * *